United States Patent
Chiang et al.

(10) Patent No.: US 10,536,584 B2
(45) Date of Patent: Jan. 14, 2020

(54) SYSTEM AND METHODS FOR TIME DEFERRED TRANSMISSION OF MOBILE DATA

(71) Applicants: Mung Chiang, Princeton, NJ (US); Carlee Joe-Wong, West Hills, CA (US); Sangtae Ha, Princeton, NJ (US); Soumya Sen, Princeton, NJ (US)

(72) Inventors: Mung Chiang, Princeton, NJ (US); Carlee Joe-Wong, West Hills, CA (US); Sangtae Ha, Princeton, NJ (US); Soumya Sen, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 547 days.

(21) Appl. No.: 15/299,893

(22) Filed: Oct. 21, 2016

(65) Prior Publication Data

US 2017/0048395 A1 Feb. 16, 2017

Related U.S. Application Data

(63) Continuation of application No. 13/780,941, filed on Feb. 28, 2013, now abandoned.
(Continued)

(51) Int. Cl.
*H04M 15/00* (2006.01)
*G06Q 30/02* (2012.01)

(52) U.S. Cl.
CPC ........ *H04M 15/58* (2013.01); *G06Q 30/0206* (2013.01); *H04M 15/60* (2013.01); *H04M 15/8027* (2013.01)

(58) Field of Classification Search
CPC combination set(s) only.
See application file for complete search history.

(56) References Cited

U.S. PATENT DOCUMENTS 6,747,976 B1 6/2004 Bensaou et al.
8,060,154 B1 11/2011 Bali et al.
(Continued)

OTHER PUBLICATIONS

Ha et al., "TUBE: Time-dependent pricing for mobile data," in Proceedings of ACM SIGCOMM, Aug. 2012.
(Continued)

*Primary Examiner* — Sujay Koneru
(74) *Attorney, Agent, or Firm* — Meagher Emanuel Laks Goldberg & Liao, LLP (57) ABSTRACT

A system for time deferred usage of mobile data by a plurality of user devices each coupled to a network server and running one or more applications. The system includes a network measurement module, user profiling module and a price-optimization computational module located at the network server and a user interface module located at each user device. The network measurement module collects traffic data from each of the applications to generate the historical congestion data and current congestion data. The user profiling module is configured to receive user reaction data and determine how much mobile data for each application may be deferred to a later point in time to generate the predicted user reaction data. The price-optimization receives the historical congestion data and the current network congestion data from the network measurement module and the predicted user reaction data from the user profiling module and generate day-ahead time-dependent price data for a plurality of upcoming timeslots of mobile data based on the historical congestion data, current network congestion, predicted user reaction data, network operator costs for data exceeding maximum network capacity and network operator costs for supplying data in less-congested time periods. The user interface receives a time interval based delay selection input for each of the one or more applications, select one or more of the upcoming data timeslots of mobile data for use
(Continued)

by the one or more applications and delay mobile data usage by each of the one or more applications based on the delay selection input.

20 Claims, 6 Drawing Sheets

Related U.S. Application Data (60) Provisional application No. 61/604,900, filed on Feb. 29, 2012.

(56) References Cited

U.S. PATENT DOCUMENTS

| | | | |
|---|---|---|---|
| 2003/0091031 | A1 | 5/2003 | Kuhlmann et al. |
| 2004/0220869 | A1* | 11/2004 | Perera .................... G06Q 10/06 705/37 |
| 2006/0034438 | A1 | 2/2006 | O'Neill |
| 2006/0073810 | A1* | 4/2006 | Pyhalammi ............. H04L 12/14 455/407 |
| 2006/0166689 | A1* | 7/2006 | Phillips ................. G06F 16/273 455/502 |
| 2007/0087756 | A1 | 4/2007 | Hoffberg |
| 2008/0101460 | A1 | 5/2008 | Rodriguez |
| 2008/0311885 | A1 | 12/2008 | Dawson et al. |
| 2010/0030706 | A1 | 2/2010 | Kannan et al. |
| 2011/0029347 | A1* | 2/2011 | Kozat .................... G06Q 30/08 705/7.39 |
| 2011/0071882 | A1* | 3/2011 | Jakagnanam .......... G06Q 10/04 705/7.31 |
| 2011/0269421 | A1* | 11/2011 | Moore .................... H04L 12/14 455/406 |
| 2012/0278220 | A1* | 11/2012 | Chassin ................. G06Q 40/00 705/37 |
| 2013/0096983 | A1* | 4/2013 | Forbes ............... G06Q 30/0202 705/7.31 |
| 2013/0346139 | A1* | 12/2013 | Steven .................. G06Q 10/00 705/7.24 |
| 2013/0346157 | A1* | 12/2013 | Avrilionis .......... G06Q 30/0206 705/7.35 |

OTHER PUBLICATIONS

Cheng, R., "Verizon to curb highest data users", Feb. 4, 2011, Wall Street Journal.

Cisco Systems., Cisco visual networking index: Forecast and methodology:, 2011-2016, May 30, 2012. http://tinyurl.com/VNI2012.

Clark, D., D., "Internet cost allocation and pricing", In Internet Economics, L.W. McKnight and J.P. Bailey, Eds. The MIT Press, 1997, pp. 215-252.

Cocchi, R., Shenker, S., Estrin, D., and Zhang, L., "Pricing in computer networks: Motivation, formulation, and example", IEEE/ACM Transactions on Networking 1 (1993), 614-627.

Falaki, H., Mahajan, R., Kandula, S., Lymberopoulos, D., Govindan, R., and Estrin, D., "Diversity on smartphone usage", in Proc. of AMC MobiSys (2010), AMC, pp. 179-194.

Goldman, D., "AT&T hikes rates on smartphone plans", Jan. 19, 2012. CNN Money.

Gupta, A., Stahl, D., and Whinston, A., "Priority pricing of integrated services networks", In Internet Economics, L.W. McKnight and J.P. Bailey, Eds, The MIT Press, 1997, pp. 323-352.

Ha, S., Sen, S., Joe-Wong, C., Im, Y., and Chiang, M. TUBE survey questions and Demographics, Jan. 2012. http://scenic.princetion.edu/tube/TUBE_Survey_pfd.

Joe-Wong, C., Ha, S., and Chiang, M., "Time-dependent broadband pricing: Feasibility and benefits", Proc of IEEE ICDCDS (Jun. 2011).

Kelly, F., Maulloo, A.K., and Tan, D.H.K., "Rate control for communication networks: Shadow prices, proportional fairness, and stability", Journal of Operational Research Society 49 (1998), 237-252.

Mackie-Mason, J., and Varian, H., "Pricing the Internet. In Public Access to the Internet", B. Kahin and J. Keller, Eds. Prentice-Hall, 1995, pp. 269-314.

* cited by examiner

SYSTEM AND METHODS FOR TIME DEFERRED TRANSMISSION OF MOBILE DATA

CROSS REFERENCE TO RELATED APPLICATIONS

This application claims priority to earlier filed U.S. Provisional Application No. 61/604,900 which was filed on Feb. 29, 2012 and U.S. patent application Ser. No. 13/780,941 filed Feb. 28, 2013, both of which are incorporated herein in their entirety.

TECHNICAL FIELD

The subject matter described herein relates generally to the field of communication and computer networking, wireless systems and networks, network economics and human computer interactions, and information retrieval and data analytics.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

Recent years have witnessed dramatic surges in bandwidth demand. According to the Cisco Visual Networking Index, wireless Internet bandwidth demand will increase at a compound rate of 108% over the next five years. Relying solely on technology developments such as long term evolution (LTE) and WiMAX to increase the supply of wireless capacity is no longer viable going forward in the next decade. Pricing innovations must also be considered to regulate demand.

Many Internet Service Providers (ISPs), both wireless and wireline broadband access providers such as AT&T and Comcast, address the problem of growing bandwidth demands by using usage-based pricing. Yet pricing based just on monthly bandwidth usage still leaves a timescale mismatch: ISP revenue is based on monthly usage, but peak-hour congestion dominates its cost structure. Ideally, ISPs would like bandwidth consumption to be spread evenly over all the hours of the day.

To solve the problem of congestion, some ISPs have been experimenting with different pricing schemes for voice traffic. There are two such schemes in practice, time-dependent pricing and congestion-dependent pricing. Time-dependent pricing for voice calls is in use by some ISPs in India, while congestion-dependent pricing for voice traffic is used by MTN in Africa. However, neither time-dependent nor congestion-dependent pricing for data traffic has been used.

Time-dependent pricing for data traffic is the subject matter of this invention, which provides a system and methods to enable such pricing. Time-dependent Usage-based Broadband Price Engineering (TUBE) is a term that will be used in the following to denote such a system. Described herein are theory, algorithms, and a full system implementation for this new pricing system and methods.

BRIEF DESCRIPTION OF THE DRAWINGS

A more detailed understanding may be obtained from the following description, given by way of example in conjunction with the accompanying drawings herein.

DETAILED DESCRIPTION

TUBE differs from existing state-of-the-art mechanisms in many ways. For example, TUBE is a pricing mechanism that addresses the problem of peak-demand in the context of data as opposed to just voice. It combines the ideas of TDP (time-dependent pricing) and usage-based pricing into a coherent pricing scheme with full system implementation.

Furthermore, the existing practices fall short of providing a complete solution that does a fine-grained analysis of the user behavior, traffic usage patterns, automation of user response to dynamic pricing etc., while TUBE incorporates all these features.

TUBE is a complete, novel system that is based on mathematical rigor, sophisticated theory and algorithms, and provides an end-to-end solution for pricing. It helps to realize the full potential of dynamic pricing that is beneficial to both users and service providers by adjusting the prices in response to their usage behaviors.

TUBE also makes it easy to ISPs to provide much cheaper data plans and can be used in developing wireless backhauls for providing broadband services in rural areas.

TUBE is a system for creating innovative wireless data plans to enable time-dependent pricing and congestion management. ISPs that adopt TUBE will be able charge users based on not just how much bandwidth they consume but also when they do so. The system allows service providers to offer optimized prices that vary over different times of the day and provides incentives to users for shifting their traffic demand to periods when the prices are cheaper. This benefits both parties involved; the service providers can reduce their peak bandwidth demand and users get to save money by deferring their high bandwidth, delay tolerant application sessions.

There are three key immediate applications of TUBE: 1) As a pricing system for time-dependent usage-based broadband data plans; 2) Reducing bandwidth requirements in rural back hauling; and 3) As a congestion management tool for improving cellular network performance, including 3G and 4G LTE networks.

Figure 1:
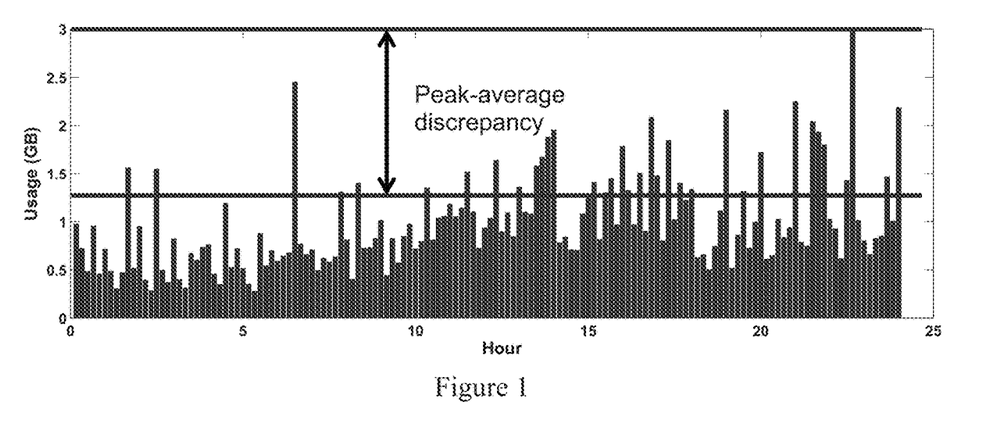
FIG. 1 shows a sample trace of data usage over one day. The double arrows indicate a large discrepancy between the peak and average traffic over a day—there is significant opportunity for the traffic profile to become more even if usage is shifted from peak to "valley" (lower usage) periods.
Figure 2:
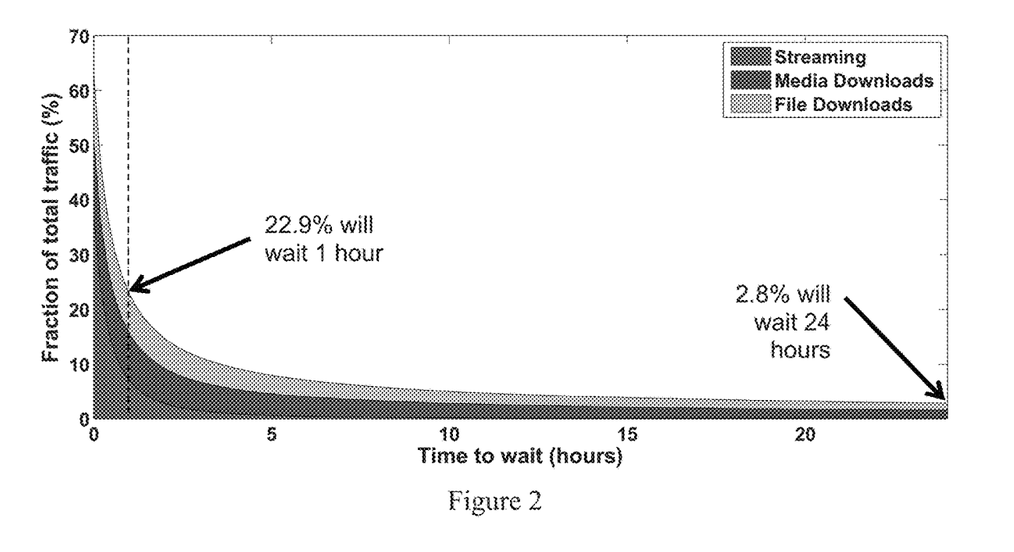
FIG. 2 shows an estimate of how long users are willing to wait for different types of traffic, given a 30% discount. Nearly 23% of traffic by volume can be delayed 1 hour, while only 2.8% (mostly download traffic) can wait 24 hours.
Figure 3:
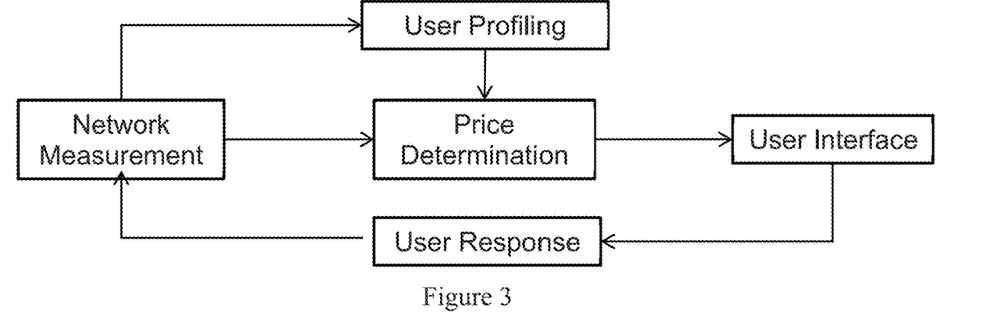
FIG. 3 shows an overall schematic of the Time-dependent Usage-based Broadband price Engineering (TUBE) system architecture, with the four main system components of user behavior estimation, price calculation, a user interface, and network measurement.

The TUBE system may be extended to implement time-dependent pricing for voice. Additionally, TUBE may be used to offer ultra-affordable data plans or Ultra-Affordable Plans (UAPs). The key idea is to accommodate UAP users by reducing the timescale of TUBE's price optimization and using automation of user responses to leverage the presence of "flashy whitespaces" in the air. The flashy whitespaces, which appear even in congested spectrum, are periods of time when the bandwidth becomes available. Therefore, users who are somewhat delay tolerant will need to pay very little by using UAP data plans. FIG. 1 shows examples of variations in bandwidth demand over time.

The TUBE system leverages the rigorous theory of optimization. It charges users based on not just "how much" bandwidth is consumed but also "when" it is consumed.

TDP is a pricing innovation that is uniquely positioned to help ISPs meet the challenges of growing user demand by spreading out the congestion hour traffic more evenly throughout the day, thus regulating bandwidth consumption and reducing the burden of over-provisioning for peak hour demand for wireless operators.

As a pricing strategy, TDP also sits lower on the radar screen of network neutrality scrutiny, as it does not differentiate based on traffic type, protocol, or user class.

Figure 4:
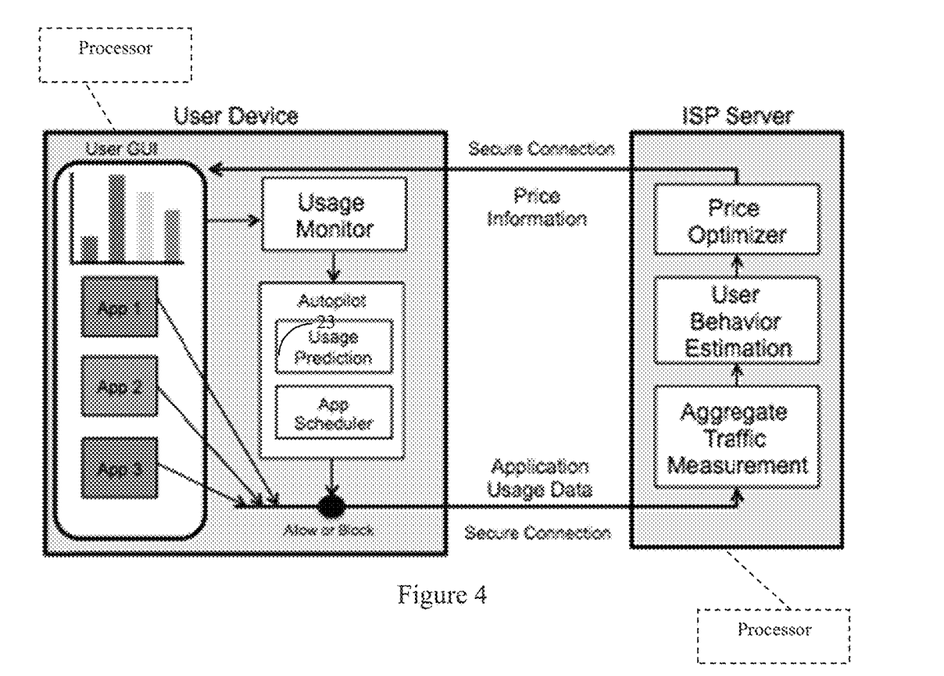
FIG. 4 shows the overall architecture of the TUBE system, including the main modules of the TUBE Optimizer and TUBE User Interface. The architecture incorporates the four system modules from FIG. 3's overall schematic, including more sub-modules within the user interface component.

The TUBE Architecture overview is shown FIG. 4. TUBE consists of the TUBE Optimizer and TUBE User Interface. TUBE Optimizer is installed on ISP servers; it measures the user-generated traffic and determines the prices offered to the users using our advanced optimization algorithm. It consists of a measurement engine to monitor user's traffic usage, a profiling engine to estimate user's delay tolerance for each traffic class, and a price optimization engine to calculate the optimal prices and publish it to users.

Figure 5:
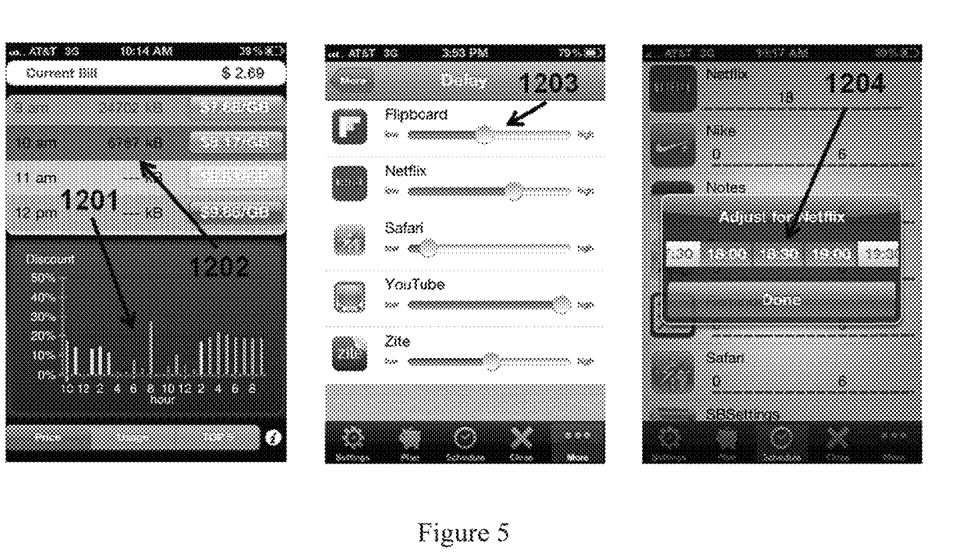
FIG. 5 shows a TUBE GUI on an iPhone, where iPhone users can view the past and future prices (1201) as well as their past usage (1202), set delay tolerances for different applications (1203), and manually schedule applications to be blocked at different times of the day (1204).
Figure 6:
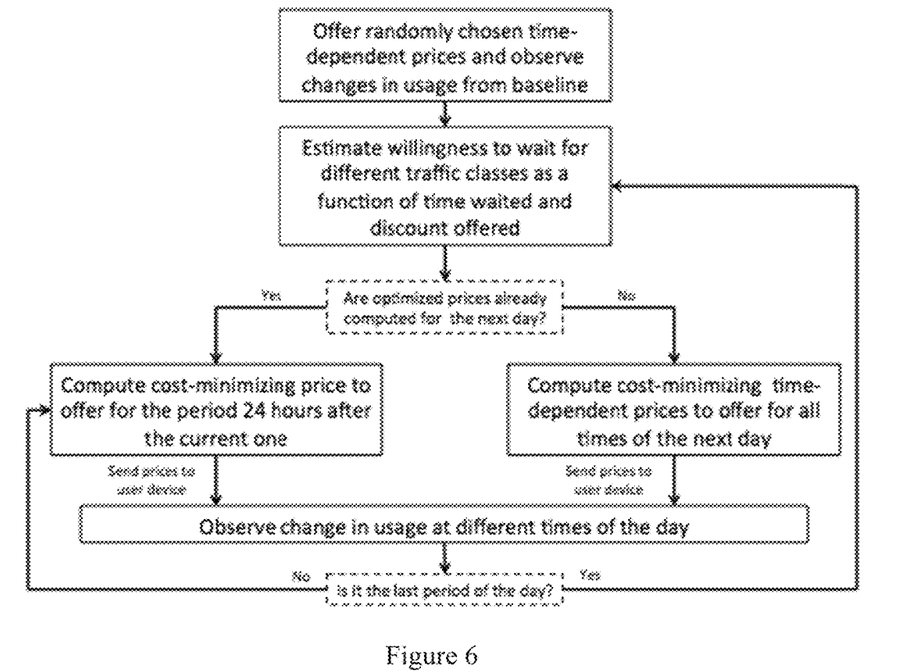
FIG. 6 shows a flowchart of the price computation and user behavior estimation algorithm. The algorithm is initialized with randomly chosen prices, and a corresponding estimate of users' willingness to wait for different types of traffic is then computed. Day-ahead prices are then computed indefinitely, with the estimated willingness to wait updated at the end of each day. Dashed boxes represent decision points and arrows represent the sequence of events.

TUBE User Interface consists of a GUI, a profiler, and a recommendation engine, which run locally on the user's mobile device. TUBE GUI presents users with an interface to see their bandwidth usage and prices offered by the ISP that also takes user inputs. The profiling engine learns the user's usage behavior, which is then used by the recommendation engine to suggest deferral of certain application sessions to a later time when the prices are lower. Examples of TUBE GUI are shown in FIG. 5.

TUBE offers several competitive advantages. A cost-effective, high-margin, and easy-to-deploy tool for cost-savings for wireless and broadband ISPs. TUBE can reduce ISPs costs from peak data demands, lower the cost of resource investments in rural backhauls, and enable cheaper data plans for low-income users. More generally, a very timely technology in the context of the growing momentum among ISPs in using pricing as a network management tool.

Figure 7:
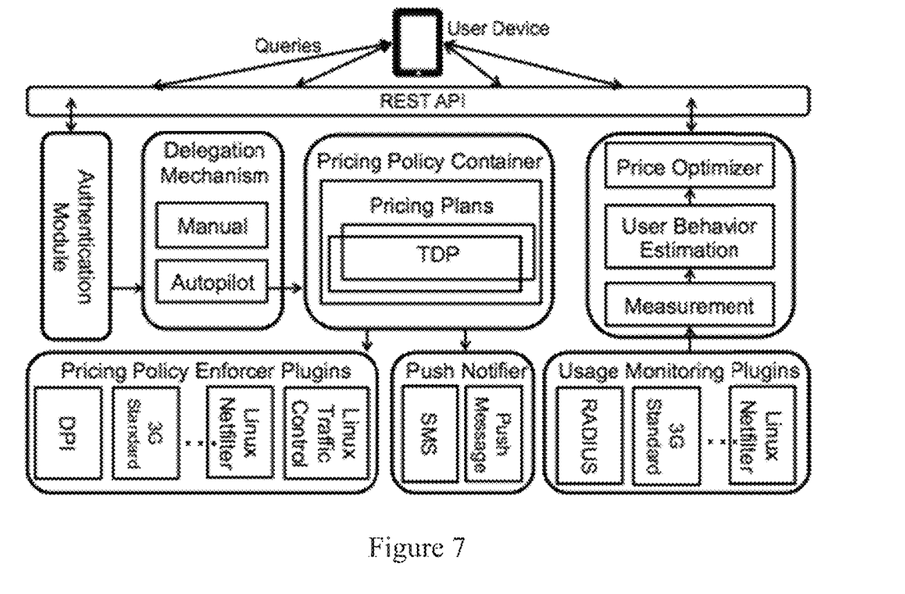
FIG. 7 shows the implementation modules for the server-side (TUBE Optimizer) part of the system architecture shown in FIG. 4. Boxes represent different modules, and arrows show the data flow between the different modules. The modules shown are one possible implementation of the TDP system. Different implementations might omit some modules or add others to accommodate the unique needs and software capabilities of different TDP deployments.
Figure 8:
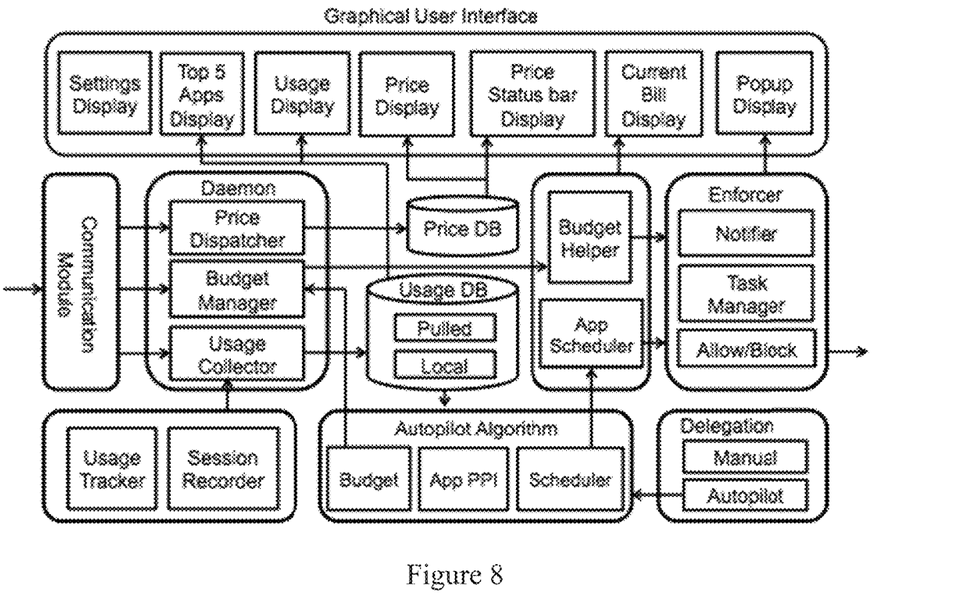
FIG. 8 shows the implementation modules for the user interface (TUBE User Interface) part of the system architecture shown in FIG. 4. As in FIG. 7, boxes represent different modules, and arrows represent data flow with the user interface. The modules shown are one possible implementation of the user interface component. Different implementations might omit some modules or add others to accommodate the unique needs and software capabilities of different TDP deployments.

In a possible embodiment, the paper "TUBE: Time-dependent pricing for mobile data," by Sangtae Ha, Soumya Sen, Carlee Joe-Wong, Youngbin Im, and Mung Chiang, in Proceedings of ACM SIGCOMM August 2012, presents a practical system for an end-to-end solution in pricing innovation, complete with algorithms, prototype implementation, and field trials. FIGS. 7 and 8 show software modules for the prototype implementation.

In the above paper referenced, the steps involved are creation of an analytical framework for optimal pricing for time-dependent usage-based broadband pricing, implementing the entire system by developing the software capability for generating the optimal price information, developing algorithm for user profiling and recommendation system to help user decisions, and creating graphical user interfaces for our TUBE application that will run on the user's handset.

This system for implementing time-dependent usage-based broadband price engineering has significant commercial value for service providers. This system will be used in broadband pricing by ISPs and for offering low-cost data plans. Additionally, it may also be used by ISPs to reduce capacity investments needed to create wireless backhaul for providing broadband services in rural areas, where deploying traditional wired networks is not economically feasible due to low population density.

This invention allows ISPs to reduce the peak-usage in their network and provides users a way to reduce their monthly bills by shifting their demand to low-priced and low-congested time periods. These benefits that TUBE provides to ISPs and users give it a distinct advantage over existing flat-rate fees, usage-based charges, and dynamic tariff schemes that are in practice today. TUBE also allows for creating low-cost data plans and reducing ISP costs of creating wireless backhauls in rural areas, which are not directly feasible with any of the existing schemes.

Figure 9:
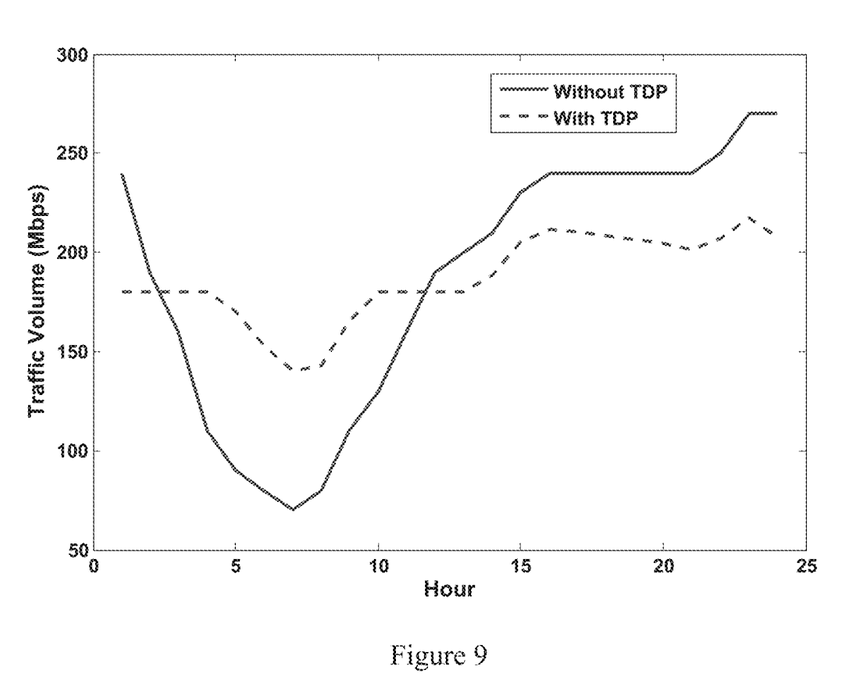
FIG. 9 shows a simulation of time-dependent pricing's effect on the usage trace over one day. The solid curve of baseline traffic without time-dependent pricing clearly has a higher peak traffic and lower "valley" traffic than the dashed curve of usage with time-dependent pricing, showing TDP's effect on reducing the peak-to-average ratio of the traffic pattern over the day.
Figure 10:
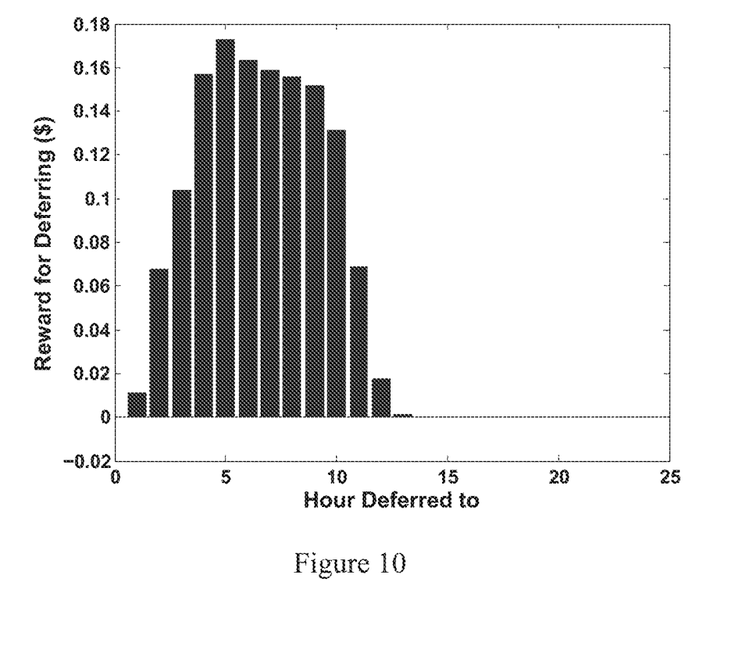
FIG. 10 shows the discounts offered in different periods of the day to achieve the traffic curve in FIG. 9. The discounts during hours with heavier traffic (14:00 and later) are zero, reflecting the heavier traffic; in contrast, more discounts are offered in the early morning hours, when traffic is lighter. A comparison with FIG. 8 shows that as expected, traffic is shifted from heavier hours, when the discount is zero, to lighter hours when a discount is offered.
Figure 11:
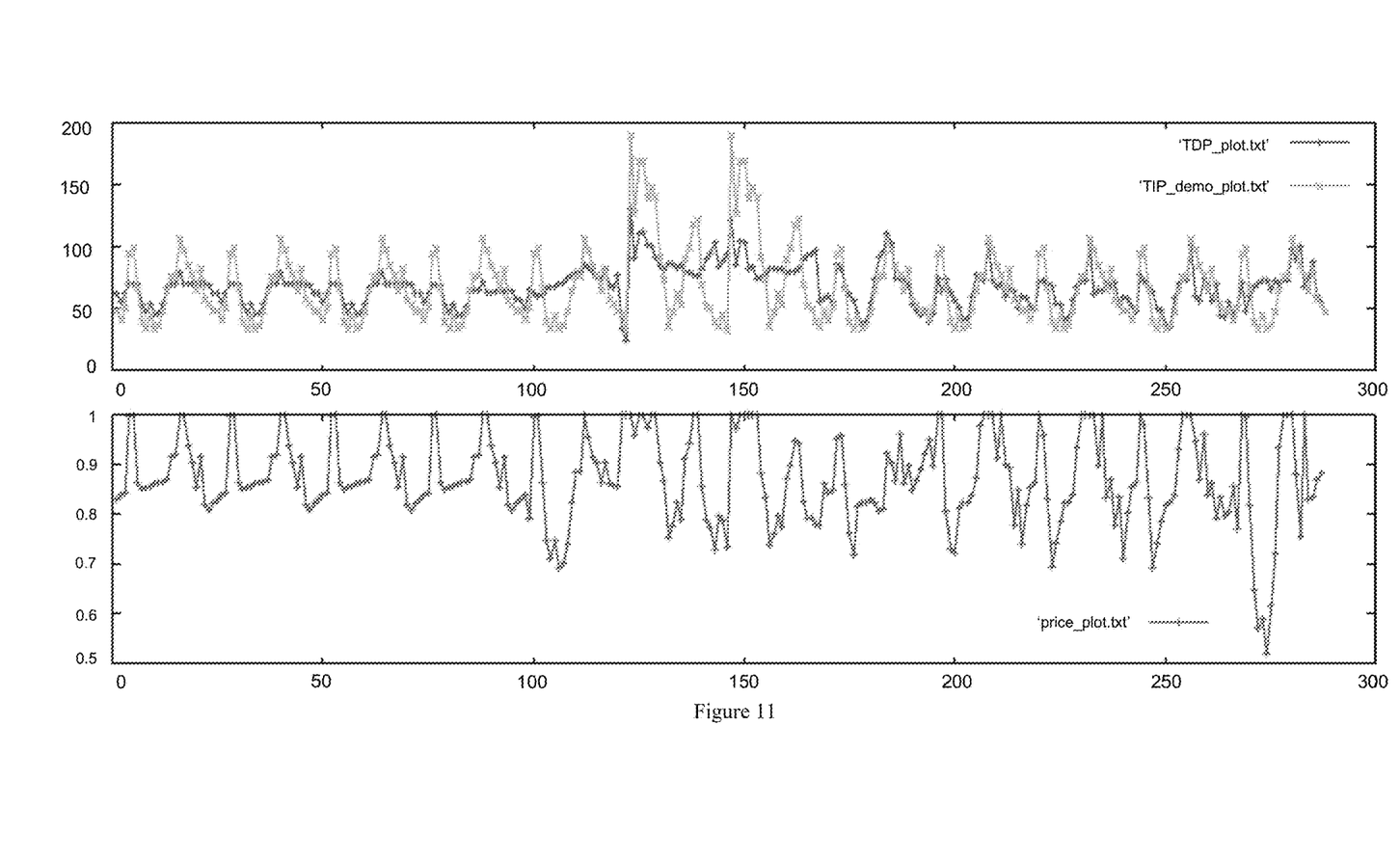
FIG. 11 shows a TDP simulation over multiple days. The top graph shows the traffic before (green) and after (red) time-dependent pricing; the red curve is visibly flatter than the green one, indicating that traffic has shifted from peak to valley times. The corresponding time-dependent prices offered are shown in the bottom graph; the prices adapt as the baseline traffic before TDP changes from day to day.

In general, charging different prices for Internet access at different times induces users to spread out their bandwidth consumption across times of the day. The questions are: is it feasible and how much benefit can it bring? This invention develops an efficient method to compute the cost-minimizing time-dependent prices for an Internet service provider (ISP), using both a static session-level model and a dynamic session model with stochastic arrivals. Our trial results demonstrate that optimal prices, which "reward" users for deferring their sessions, roughly correlate with demand in each period, and that changing prices based on real-time traffic estimates may significantly reduce ISP cost. The degree to which traffic is evened out over times of the day depends on the time-sensitivity of sessions, cost structure of the ISP, and amount of traffic not subject to time-dependent prices. Simulations of this effect are shown in FIGS. 9-11.

The TUBE system architecture involves a price optimization unit, user profiler, recommendation system, and formats for interchanging price and usage information between user's end device and ISP's servers. The TUBE system allows ISPs to reduce the peak-usage in their network and provides a way for ISPs to offer a low-cost data plans.

Additional disclosure is contained in "Time-Dependent Broadband Pricing: Feasibility and Benefits" Carlee Joe-Wong, Sangtae Ha, Mung Chiang, 2011 31st International Conference on Distributed Computing Systems (ICDCS), 2011 IEEE, pp288-298, which is incorporated herein in its entirety as if fully set forth. The references cited throughout this application including any appendices are incorporated for all purposes apparent herein and in the references themselves as if each reference was fully set forth. For the sake of presentation, specific ones of these references are cited at particular locations herein and in other references. A citation of a reference at a particular location indicates a manner or manners in which the teachings of the reference are incorporated. However, a citation of a reference in a particular location does not limit the manner in which all of the teachings of the cited reference are incorporated for all purposes.

Although features and elements are described above in particular combinations, each feature or element can be used alone without the other features and elements or in various combinations with or without other features and elements. The methods or flow charts provided herein may be at least partially implemented in a computer program, software, or firmware incorporated in a computer-readable storage medium for execution by a general purpose computer or a processor. For example, the user device and the ISP server may include one or more processors configured with the code to enable the functionality disclosed above. Examples of computer-readable storage mediums include non-transitory devices such as read only memory (ROM), random access memory (RAM), registers, cache memory, semiconductor memory devices, magnetic media such as internal hard disks and removable disks, magneto-optical media, and optical media such as CD-ROM disks, and digital versatile disks (DVDs). Suitable processors include, by way of example, a general purpose processor, a special purpose processor, a conventional processor, a digital signal processor (DSP), a plurality of microprocessors, one or more microprocessors in association with a DSP core, a microcontroller, Application Specific Integrated Circuits (ASICs), Field Programmable Gate Arrays (FPGAs) circuits, any other type of integrated circuit (IC), and/or a state machine.

It is understood, therefore, that the invention is not limited to the particular embodiments disclosed, but is intended to cover all modifications which are within the spirit and scope of the invention as defined by appended claims, the above description, and any appendices.

What is claimed is:

1. A system for time deferred usage of mobile data by a plurality of user devices each coupled to a network server and running one or more applications, wherein the system comprises:

a network measurement module, a user profiling module, and a price-optimization module located at the network server and a user interface module located at each user device;

the network measurement module being configured to collect traffic data from each of the one or more applications to generate historical congestion data and current congestion data;

the user profiling module being configured to receive user reaction data and determine how much mobile data for each application may be deferred to a later point in time to generate predicted user reaction data;

the price-optimization computational module being configured to receive the historical congestion data and the current congestion data from the network measurement module and the predicted user reaction data from the user profiling module and generate day-ahead time-dependent price data for a plurality of upcoming timeslots of mobile data based on the historical congestion data, current congestion data, predicted user reaction data, network operator costs for data exceeding maximum network capacity, and network operator costs for supplying data in less-congested time periods; and the user interface module being configured receive a delay selection input for each of the one or more applications based on the day-ahead time-dependent price data from the price-optimization computational module and delay mobile data usage by each of the one or more applications based on the delay selection input.

2. The system of claim 1, wherein the user interface module is configured to display the time-dependent price data so that a user can generate the delay selection input.

3. The system of claim 1, wherein the user interface module is configured provide the time-dependent price data to an automatic agent acting on behalf of the user so that the automatic agent can generate the delay selection input.

4. The system of claim 1, wherein the predicted user reaction data comprises a patience index and the price optimization module determines the time-dependent price data based further on the patience index.

5. The system of claim 1, wherein the user profiling module computes a delay tolerance, relative to price sensitivity, of each of the one or more applications on each user device.

6. The system of claim 1, wherein the user interface module includes an auto-pilot mode configured to make a decision on time-deferral based on user specified parameters.

7. The system of claim 6, wherein the auto-pilot decisions are made partially on the user devices and partially on network operator devices.

8. The system of claim 1, wherein the network traffic and user reaction data are collected on at least one of the user devices and network operator devices.

9. The system of claim 1, wherein the price-optimization computational module is configured to allow network operators to dynamically, over a plurality of possible timescales, adjust the price charged for each unit of data traffic based on user preferences, time of day, congestion conditions in historical records and current conditions, and application needs.

10. The system of claim 1, wherein the price-optimization computational module, user profiling module, user interface module, and network measurement module are run iteratively.

11. A system for time deferred usage of mobile data by a plurality of user devices each coupled to a network server and running one or more applications, wherein the system comprises:
- a network measurement module, a user profiling module, and a price-optimization module located at the network server;
- the network measurement module being configured to collect traffic data from each of the one or more applications to generate historical congestion data and current congestion data;
- the user profiling module being configured to receive user reaction data and determine how much mobile data for each application may be deferred to a later point in time to generate predicted user reaction data; and
- the price-optimization computational module being configured to receive the historical congestion data and the current congestion data from the network measurement module and the predicted user reaction data from the user profiling module and generate day-ahead time-dependent price data for a plurality of upcoming timeslots of mobile data based on the historical congestion data, current congestion data, predicted user reaction data, network operator costs for data exceeding maximum network capacity, and network operator costs for supplying data in less-congested time periods.

12. The system of claim 11, wherein the predicted user reaction data comprises a patience index and the price optimization module determines the time-dependent price data based further on the patience index.

13. The system of claim 11, wherein the user profiling module computes a delay tolerance, relative to price sensitivity, of each of the one or more applications on each user device.

14. The system of claim 11, wherein the network traffic and user reaction data are collected on at least one of the user devices and network operator devices.

15. The system of claim 11, wherein the price-optimization computational module is configured to allow network operators to dynamically, over a plurality of possible timescales, adjust the price charged for each unit of data traffic based on user preferences, time of day, congestion conditions in historical records and current conditions, and application needs.

16. The system of claim 11, wherein the price-optimization computational module, user profiling module, and network measurement module are run iteratively.

17. A method for deferring usage of mobile data by a plurality of user devices each coupled to a network server and running one or more applications, the network server including a network measurement module, a user profiling module, and a price-optimization module, the method comprising:
- configuring the network measurement module to collect traffic data from each of the one or more applications to generate historical congestion data and current congestion data;
- configuring the user profiling module to receive user reaction data and determine how much mobile data for each application may be deferred to a later point in time to generate predicted user reaction data; and
- configuring the price-optimization computational module to receive the historical congestion data and the current congestion data from the network measurement module and the predicted user reaction data from the user profiling module and generate day-ahead time-dependent price data for a plurality of upcoming timeslots of mobile data based on the historical congestion data, current congestion data, predicted user reaction data, network operator costs for data exceeding maximum network capacity, and network operator costs for supplying data in less-congested time periods.

18. The method of claim 17, further comprising configuring the user profiling module to compute a delay tolerance, relative to price sensitivity, of each of the one or more applications on each user device.

19. The method of claim 17, further comprising configuring the price-optimization computational module to allow network operators to dynamically, over a plurality of possible timescales, adjust the price charged for each unit of data traffic based on user preferences, time of day, congestion conditions in historical records and current conditions, and application needs.

20. The method of claim 17, further comprising iteratively running the configured price-optimization computational module, user profiling module, and network measurement module.

* * * * *